(12) United States Patent
Suwa et al.

(10) Patent No.: US 9,965,842 B2
(45) Date of Patent: May 8, 2018

(54) IMAGE PROCESSING APPARATUS AND IMAGE PROCESSING METHOD

(71) Applicant: CANON KABUSHIKI KAISHA, Tokyo (JP)

(72) Inventors: Tetsuya Suwa, Yokohama (JP); Shinjiro Hori, Yokohama (JP); Tohru Ikeda, Yokohama (JP); Tomokazu Ishikawa, Yokohama (JP); Wakako Tanaka, Inagi (JP); Hidetsugu Kagawa, Kawasaki (JP); Yumi Yanai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 148 days.

(21) Appl. No.: 15/191,226

(22) Filed: Jun. 23, 2016

(65) Prior Publication Data

US 2017/0004614 A1     Jan. 5, 2017

(30) Foreign Application Priority Data

Jul. 1, 2015   (JP) ................................ 2015-132958

(51) Int. Cl.
*G06K 9/00* (2006.01)
*G06T 7/00* (2017.01)
(Continued)

(52) U.S. Cl.
CPC ............... *G06T 7/0004* (2013.01); *B41J 3/44* (2013.01); *G06F 3/12* (2013.01); *H04N 1/00* (2013.01); *G06T 2207/30144* (2013.01)

(58) Field of Classification Search
None
See application file for complete search history.

(56) References Cited

U.S. PATENT DOCUMENTS 5,315,413 A * 5/1994 Yamamoto ............... H04N 1/58
                                                    348/253
7,995,250 B2 * 8/2011 Kato ....................... H04N 1/46
                                                    250/208.1
(Continued)

FOREIGN PATENT DOCUMENTS

JP        2013-185862        9/2013

OTHER PUBLICATIONS

Kizuki, "Algorithm inspired by Peripheral Vision and Involuntary Eye Movement", Journal of the Japan Society for Precision Engineering, vol. 79, No. 11, 2013, p. 1045-1049.
(Continued)

*Primary Examiner* — Shervin Nakhjavan
(74) *Attorney, Agent, or Firm* — Fitzpatrick, Cella, Harper & Scinto

(57) ABSTRACT

An image processing apparatus sets a predetermined reading resolution for acquiring image data and a division size for performing a predetermined process on the image data and extract a unique portion from image data resulting from performing the predetermined process. The predetermined process includes an averaging process on the image data for each of division areas obtained by dividing the image data by the predetermined division size, a quantization process for quantizing values obtained by the averaging process, and an addition process for adding values obtained by the quantization process, that are different in the dividing way of the image data in the averaging process. The setting unit sets the predetermined reading resolution so as to make the width of the unique portion in the image correspond to N read pixels (N≥2), and sets the division size so as to have a width larger than N pixels.

19 Claims, 19 Drawing Sheets

(51) Int. Cl.
*B41J 3/44* (2006.01)
*G06F 3/12* (2006.01)
*H04N 1/00* (2006.01)

(56) References Cited

U.S. PATENT DOCUMENTS

| | | | |
|---|---|---|---|
| 8,503,031 B2 | 8/2013 | Kajihara | |
| 8,619,319 B2 * | 12/2013 | Tsuchiya | H04N 1/40068 |
| | | | 358/1.2 |
| 8,830,530 B2 | 9/2014 | Sano | |
| 9,064,202 B2 | 6/2015 | Tanaka | |
| 9,087,291 B2 | 7/2015 | Hori | |
| 9,092,720 B2 | 7/2015 | Nakagawa | |
| 9,210,292 B2 | 12/2015 | Miyake | |
| 9,728,373 B2 * | 8/2017 | Kikuiri | H01J 37/222 |
| 2002/0002679 A1 * | 1/2002 | Murakami | G06K 9/522 |
| | | | 713/176 |
| 2003/0133606 A1 | 7/2003 | Yano | |
| 2007/0103743 A1 * | 5/2007 | Klassen | H04N 1/00002 |
| | | | 358/509 |
| 2010/0111407 A1 * | 5/2010 | Hashizume | H04N 1/387 |
| | | | 382/164 |
| 2013/0259366 A1 * | 10/2013 | Tsugimura | G06K 9/4652 |
| | | | 382/164 |
| 2016/0167414 A1 | 6/2016 | Yanai | |
| 2016/0167415 A1 | 6/2016 | Ikeda | |
| 2016/0173725 A1 | 6/2016 | Kato | |

OTHER PUBLICATIONS

U.S. Appl. No. 14/991,618, filed Jan. 8, 2016.
U.S. Appl. No. 15/192,229, filed Jun. 24, 2016.
U.S. Appl. No. 15/191,210, filed Jun. 23, 2016.
U.S. Appl. No. 15/192,243, filed Jun. 24, 2016.
U.S. Appl. No. 15/192,216, filed Jun. 24, 2016.
U.S. Appl. No. 15/191,241, filed Jun. 23, 2016.

* cited by examiner

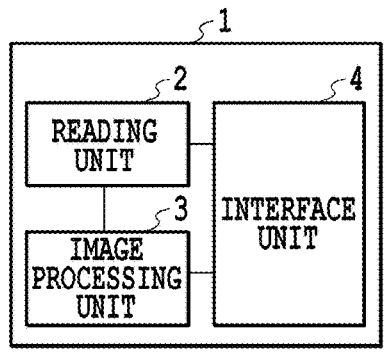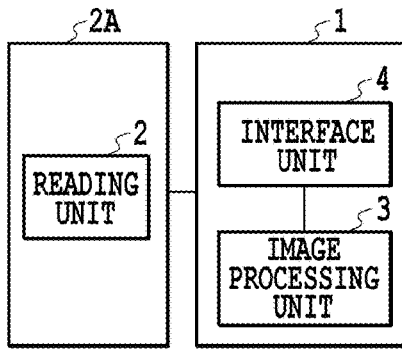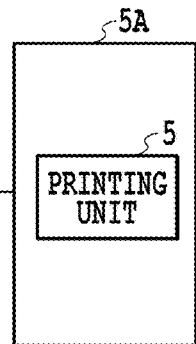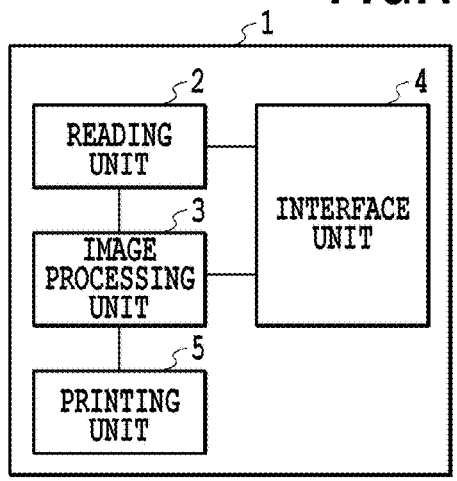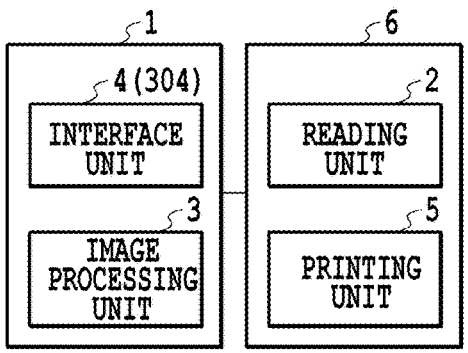

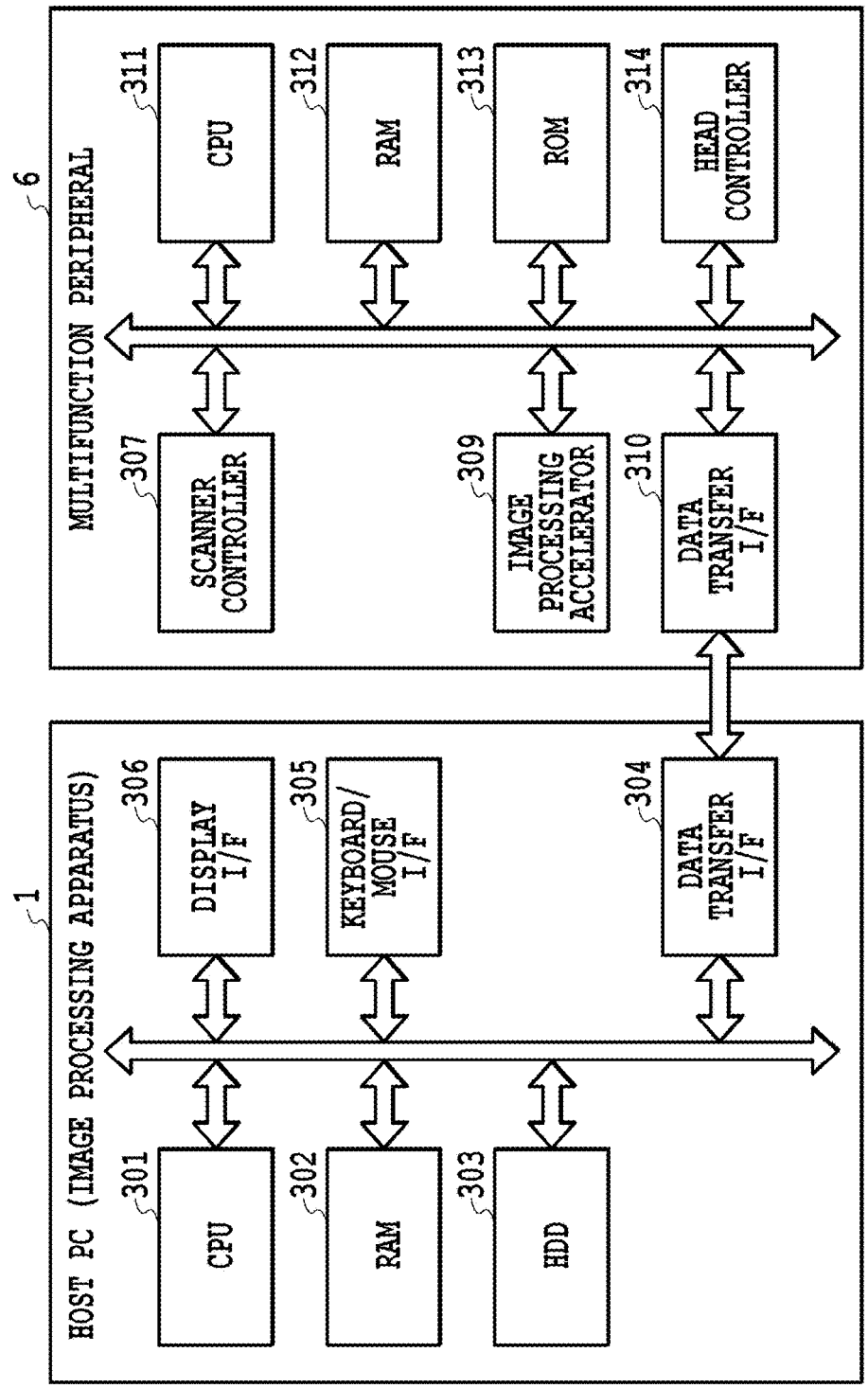

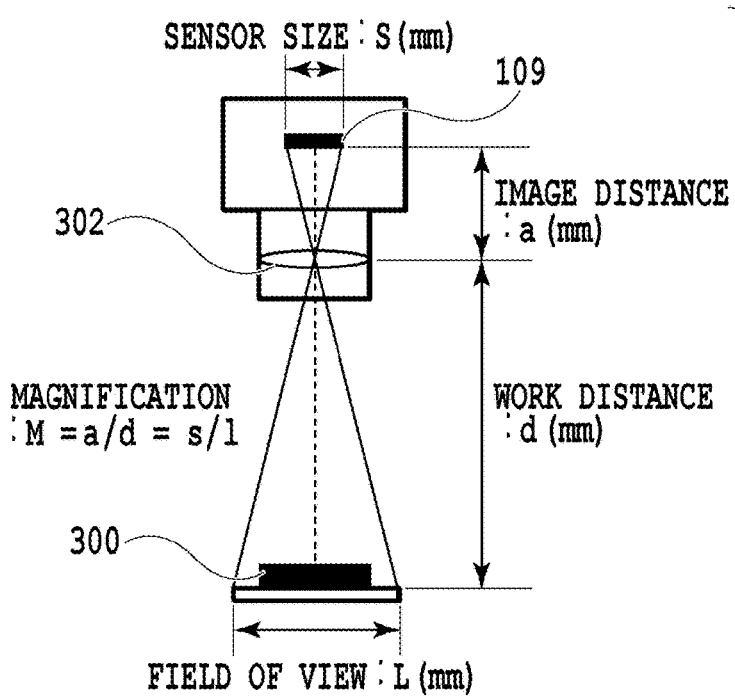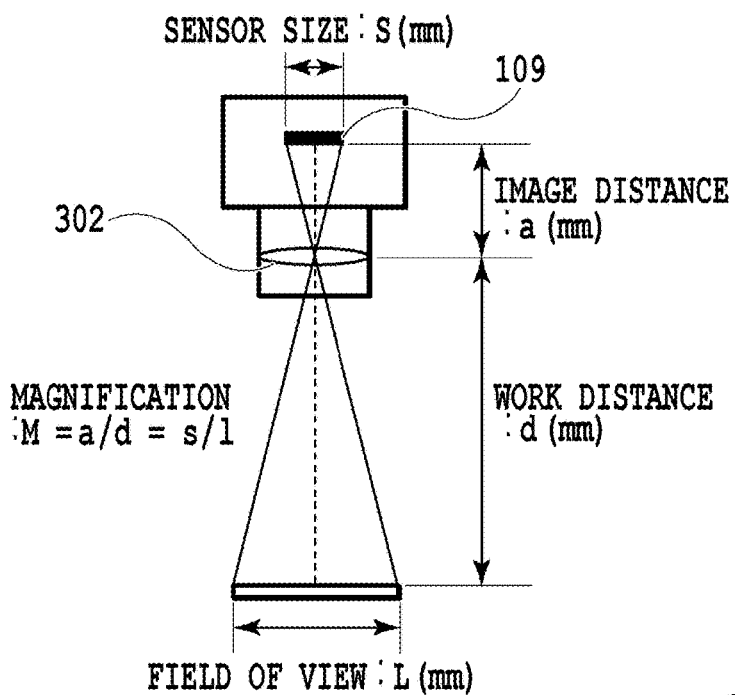
FIG.11

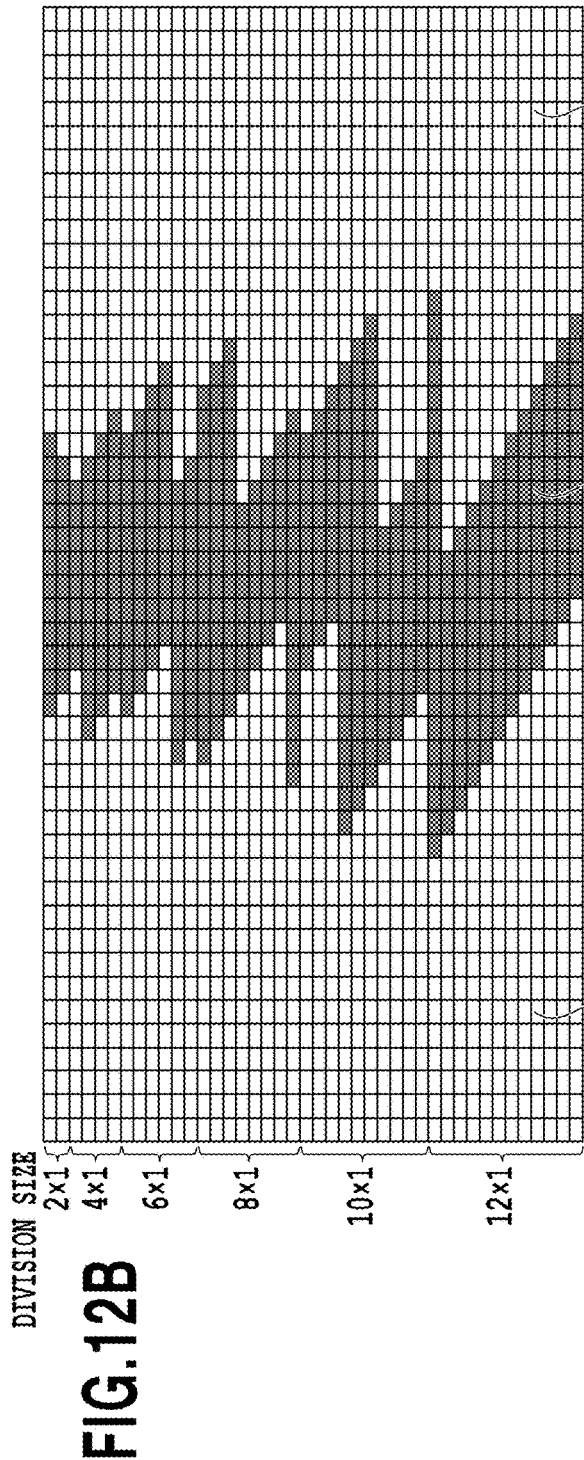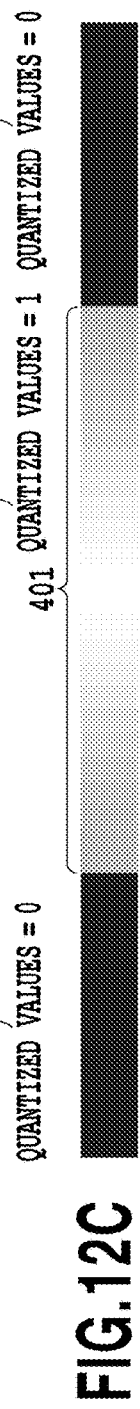

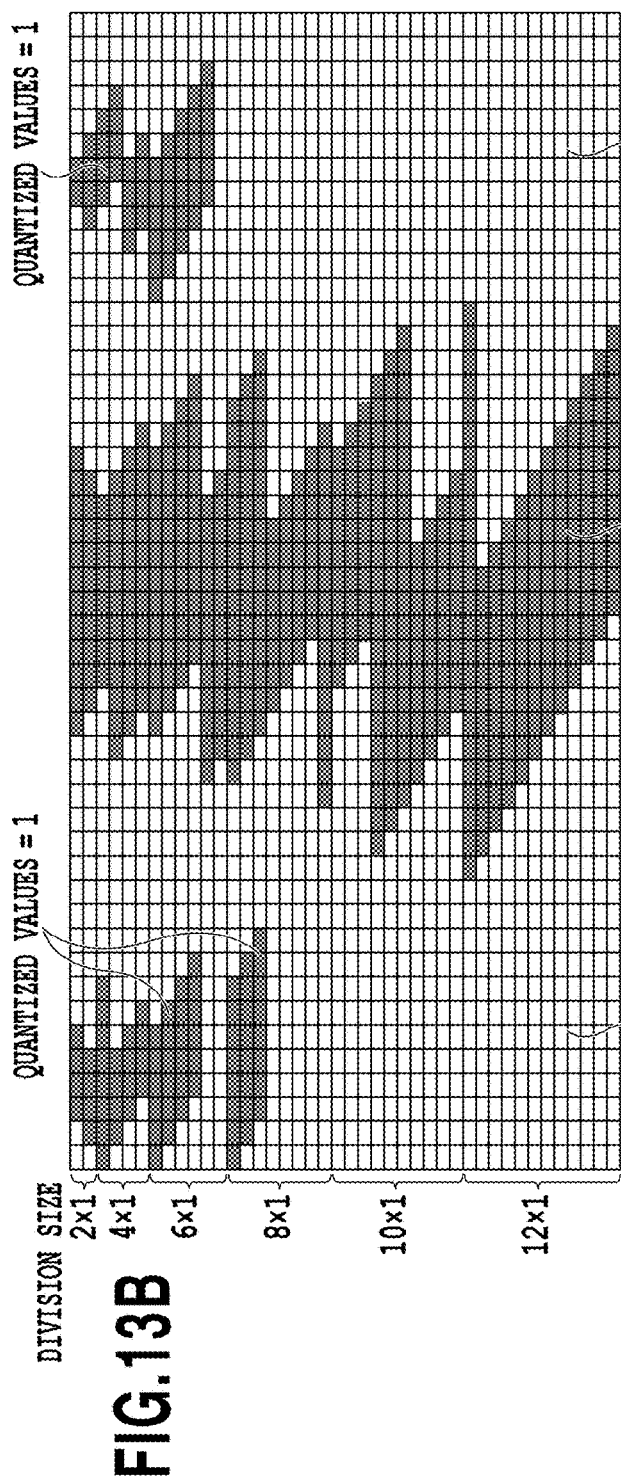

IMAGE PROCESSING APPARATUS AND IMAGE PROCESSING METHOD

BACKGROUND OF THE INVENTION

Field of the Invention

The present invention relates to an image processing apparatus and image processing method adapted to extract a defect (unique portion) of an inspection object.

Description of the Related Art

Japanese Patent Laid-Open No. 2013-185862 or ""KIZUKI" Algorithm inspired by Peripheral Vision and Involuntary Eye Movement", Journal of the Japan Society for Precision Engineering, Vol. 79, No. 11, 2013, p. 1045-1049 discloses an algorism for detecting a defect of an inspection object in accordance with a human visual mechanism. Specifically, after imaging an inspection object, the resulting image is divided into division areas having a predetermined size, and averaging and quantization are performed for each of the division areas. In addition, under multiple sets of conditions determined by changing the size and/or phase of a division area, such a process is performed, and from a result of adding the resulting quantized values, the presence or absence of a defect is determined, and if present, the position of the defect is also determined. By employing such a method, a defect of an inspection object can be efficiently extracted and made apparent without any human observation.

When employing the algorithm disclosed in Japanese Patent Laid-Open No. 2013-185862 or the above-described Journal of the Japan Society for Precision Engineering, in order to effectively detect a defect portion, it is preferable to adjust various parameters such as a resolution used when imaging an inspection object and a division size used for an image process. For example, when in order to detect a stripe or unevenness specific to an inkjet printing apparatus, using the above-describe algorithm to inspect an image printed by the printing apparatus, a reading resolution range and a division size range for suitably detecting the strip or unevenness change depending on the features of the strip or unevenness. In addition, when such parameters are not properly adjusted, the defect portion may be unextractable, or a load on and time for the extracting process may be uselessly increased. However, in Japanese Patent Laid-Open No. 2013-185862 or the above-described Journal of the Japan Society for Precision Engineering, the correspondence relationship between the features of a defect to be extracted and parameters suitable for the defect has not been referred to at all.

SUMMARY OF THE INVENTION

The present invention is made in order to solve the above-described problem. Accordingly, an object of the present invention is to provide an image processing apparatus and image processing method that can effectively detect a defect portion of a printed image by setting parameters suitable for the features of a defect to be extracted.

According to a first aspect of the present invention, there is provided an image processing apparatus adapted to inspect a printed image, the image processing apparatus comprising: an acquisition unit configured to acquire image data having a predetermined reading resolution by reading the image at the predetermined reading resolution; a processing unit configured to perform a predetermined process on the image data; an extracting unit configured to extract a unique portion from image data resulting from performing the predetermined process; and a setting unit configured to set the predetermined reading resolution and a predetermined division size, wherein the predetermined process includes an averaging process on the image data for each of division areas obtained by dividing the image data by the predetermined division size, a quantization process for quantizing values obtained by the averaging process, and an addition process for adding values obtained by the quantization process, that are different in the dividing way of the image data in the averaging process, and the setting unit sets the predetermined reading resolution so as to make a width of the unique portion in the image correspond to N read pixels (N≥2), and sets the division size so as to have a width larger than N pixels.

According to a second aspect of the present invention, there is provided an image processing apparatus adapted to inspect a printed image, the image processing apparatus comprising: an acquisition unit configured to acquire image data having a predetermined reading resolution by reading the image at the predetermined reading resolution; a processing unit configured to perform a predetermined process including a filtering process using a predetermined filter size on the image data; an extracting unit configured to extract a unique portion from image data resulting from performing the predetermined process; and a setting unit configured to set the predetermined reading resolution and the predetermined filter size, wherein the setting unit sets the predetermined reading resolution so as to make a width of the unique portion in the image correspond to N read pixels (N≥2), and sets the filter size to (2N−1) or more pixels.

According to a third aspect of the present invention, there is provided an image processing method adapted to inspect a printed image, the image processing method comprising: an acquisition step of acquiring image data having a predetermined reading resolution by reading the image at the predetermined reading resolution; a processing step of performing a predetermined process; an extracting step of extracting a unique portion from image data resulting from performing the predetermined process; and a setting step of setting the predetermined reading resolution and a predetermined division size, wherein the predetermined process includes an averaging process on the image data for each of division areas obtained by dividing the image data by the predetermined division size, a quantization process for quantizing values obtained by the averaging process, and an addition process for adding values obtained by the quantization process, that are different in the dividing way of the image data in the averaging process, and the setting step sets the predetermined reading resolution so as to make a width of the unique portion in the image correspond to N read pixels (N≥2), and sets the division size so as to have a width larger than N pixels.

According to a forth aspect of the present invention, there is provided an image processing method adapted to inspect a printed image, the image processing method comprising: an acquisition step of acquiring image data having a predetermined reading resolution by reading the image at the predetermined reading resolution; a processing step of performing a predetermined process including a filtering process using a predetermined filter size on the image data; an extracting step of extracting a unique portion from image data resulting from performing the predetermined process; and a setting step of setting the predetermined reading resolution and the predetermined filter size, wherein the setting step sets the predetermined reading resolution so as to make a width of the unique portion in the image correspond to N read pixels (N≥2), and sets the filter size to (2N−1) or more pixels.

According to a fifth aspect of the present invention, there is provided a storage medium that stores a program for instructing a computer to perform an image processing method adapted to inspect a printed image, the image processing method comprising: an acquisition step of acquiring image data having a predetermined reading resolution by reading the image at the predetermined reading resolution; a processing step of performing a predetermined process; an extracting step of extracting a unique portion from image data resulting from performing the predetermined process; and a setting step of setting the predetermined reading resolution and a predetermined division size, wherein the predetermined process includes an averaging process on the image data for each of division areas obtained by dividing the image data by the predetermined division size, a quantization process for quantizing values obtained by the averaging process, and an addition process for adding values obtained by the quantization process, that are different in the dividing way of the image data in the averaging process, and the setting step sets the predetermined reading resolution so as to make a width of the unique portion in the image correspond to N read pixels (N≥2), and sets the division size so as to have a width larger than N pixels.

According to a sixth aspect of the present invention, there is provided a storage medium that stores a program for instructing a computer to perform an image processing method adapted to inspect a printed image, the image processing method comprising: an acquisition step of acquiring image data having a predetermined reading resolution by reading the image at the predetermined reading resolution; a processing step of performing a predetermined process including a filtering process using a predetermined filter size on the image data; an extracting step of extracting a unique portion from image data resulting from performing the predetermined process; and a setting step of setting the predetermined reading resolution and the predetermined filter size, wherein the setting step sets the predetermined reading resolution so as to make a width of the unique portion in the image correspond to N read pixels (N≥2), and sets the filter size to (2N−1) or more pixels.

Further features of the present invention will become apparent from the following description of exemplary embodiments (with reference to the attached drawings).

BRIEF DESCRIPTION OF THE DRAWINGS

FIGS. 1A to 1D are diagrams illustrating examples of a form of an image processing apparatus 1 usable in the present invention;

FIG. 2 is a block diagram for explaining a control configuration in an image processing system;

FIG. 11 is a diagram illustrating a state at the time of reading an object;

FIGS. 12A to 12C are diagrams illustrating the results of quantization and addition processes;

FIGS. 13A to 13C are diagrams illustrating the results of the quantization and addition processes;

DESCRIPTION OF THE EMBODIMENTS

Figure 3:
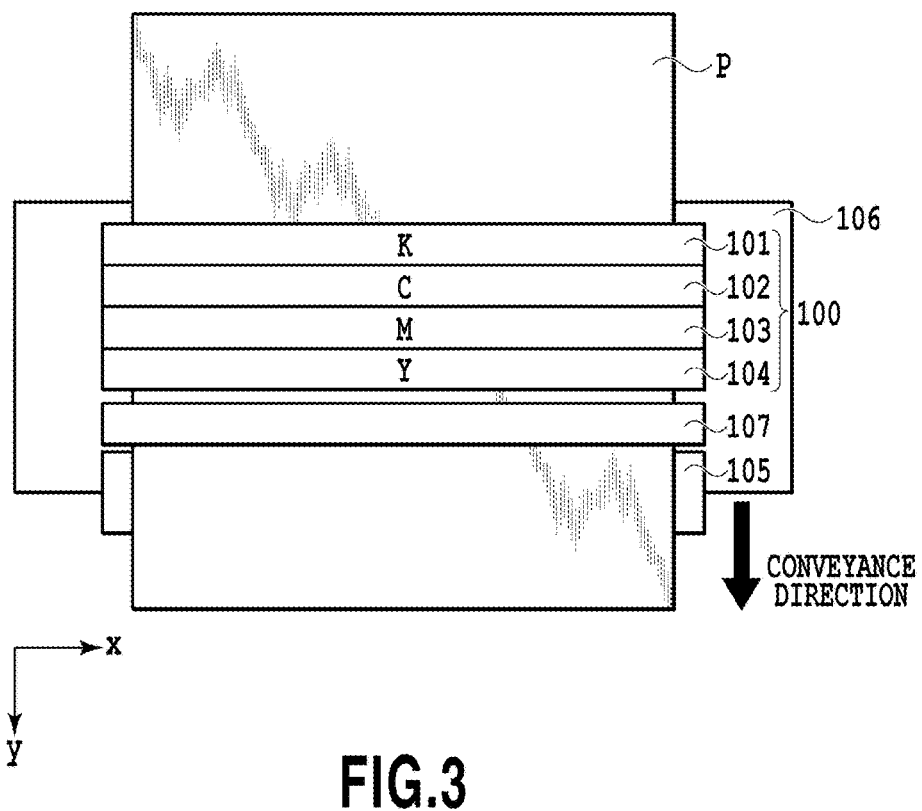
FIG. 3 is a schematic configuration diagram of an inkjet printing apparatus as a multifunction peripheral usable in the present invention.

FIGS. 1A to 1D are diagrams illustrating examples of a form of an image processing apparatus 1 usable in the present invention. An image processing apparatus of the present invention is one that on imaged image data, performs a popup process for allowing a user to easily recognize a unique portion of a printed image and a process for allowing the apparatus itself to make a determination, and as a system, can take various forms.

FIG. 1A illustrates a form in which the image processing apparatus 1 includes a reading unit 2. For example, this form corresponds to the case where a sheet on which a predetermined image is printed by an inkjet printing apparatus is placed on a reading table of the reading unit 2 inside the image processing apparatus 1 and imaged by an optical sensor or the like, and the resulting image data is processed by an image processing unit 3. The image processing unit 3 includes a CPU or an image processing accelerator capable of higher speed processing than the CPU, and controls a reading action by the reading unit 2 or performs a predetermined inspection process on the received image data.

FIG. 1B illustrates a form in which the image processing apparatus 1 is externally connected to a reading apparatus 2A including a reading unit 2. For example, this form corresponds to a system in which a PC is connected to a scanner. As a method for the connection, a general connecting method such as USB, GigE, or CameraLink can be used. Image data read by the reading unit 2 is provided to an image processing unit 3 through an interface 4, and the image processing unit 3 performs a predetermined inspection process on the received image data. Note that in this form, the image processing apparatus 1 may be further externally connected to a printing apparatus 5A including a printing unit 5.

FIG. 1C illustrates a form in which the image processing apparatus 1 includes a reading unit 2 and a printing unit 5. For example, this form corresponds to a multifunction peripheral including all of a scanner function, a printer function, and an image processing function. An image processing unit 3 controls all of a printing action in the printing unit 5, a reading action in the reading unit 2, an inspection process to be performed on an image read by the reading unit 2, and other actions and processes.

FIG. 1D illustrates a form in which the image processing apparatus 1 is externally connected to a multifunction peripheral 6 including a reading unit 2 and a printing unit 5. For example, this form corresponds to a system in which a PC is connected to a multifunction peripheral including both of a scanner function and a printer function.

The image processing apparatus 1 of the present invention can employ any of the forms in FIGS. 1A to 1D. In the following, embodiments of the present invention will be described in detail while taking the case of employing the form in FIG. 1D as an example.

First Embodiment

FIG. 2 is a block diagram for explaining a control configuration in the form of FIG. 1D. The image processing apparatus 1 is made up of a host PC and the like, in which a CPU 301 performs various processes in accordance with programs held in an HDD 303 while using a RAM 302 as a work area. For example, the CPU 301 generates image data printable by the multifunction peripheral 6 in accordance with a command received from a user through a keyboard/mouse I/F 305 or a program held in the HDD 303, and transfers the image data to the multifunction peripheral 6. Also, the CPU 301 performs a predetermined process on image data received from the multifunction peripheral 6 through a data transfer I/F 304 in accordance with a program stored in the HDD, and displays a result of the process or various pieces of information on an unillustrated display through a display I/F 306.

On the other hand, in the multifunction peripheral 6, a CPU 311 performs various processes in accordance with programs held in a ROM 313 while using a RAM 312 as a work area. In addition, the multifunction peripheral 6 includes: an image processing accelerator 309 for performing a high-speed image process; a scanner controller 307 for controlling the reading unit 2 and a print head controller 314 for controlling the printing unit 5.

The image processing accelerator 309 is hardware adapted to be able to perform an image process at higher speed than the CPU 311. Also, the CPU 311 writes parameters and data necessary for the image process into a predetermined address of the RAM 312, and thereby the image processing accelerator 309 is activated, and after reading the parameters and data, performs the predetermined image process on the data. Note that the image processing accelerator 309 is not an indispensable component, and the CPU 311 can perform an equivalent process.

The head controller 314 supplies print data to a print head 100 provided in the printing unit 5 as well as controlling the printing action of the print head 100. Also, the CPU 311 writes print data printable by the print head 100 and control parameters into a predetermined address of the RAM 312, and thereby the head controller 314 is activated, and performs an ejecting action in accordance with the print data.

The scanner controller 307 controls individual reading elements arrayed in the reading unit 2 and at the same time, outputs RGB luminance data obtained from the reading elements to the CPU 311. The CPU 311 transfers the obtained RGB luminance data to the image processing apparatus 1 through a data transfer I/F 310. As a method for the connection between the data transfer I/F 304 of the image processing apparatus 1 and the data transfer I/F 310 of the multifunction peripheral 6, a method such as USB, IEEE 1394, or LAN can be used.

FIG. 3 is a schematic configuration diagram of an inkjet printing apparatus (hereinafter also simply referred to as a printing apparatus) usable as the multifunction peripheral 6 in the present embodiment. The printing apparatus in the present embodiment is a full-line type printing apparatus, in which the print head 100 and a read head 107 both having the same width as that of a possible sheet P as a print medium or an inspection object are parallel arranged. The print head 100 includes four printing element arrays 101 to 104 respectively adapted to eject black (K), cyan (C), magenta (M), and yellow (Y) inks, and these printing element arrays 101 to 104 are parallel arranged in a conveyance direction of the sheet P (Y direction). Further downstream of the printing element arrays 101 to 104, the read head 107 is disposed. In the read head 107, multiple reading elements for reading a printed image are arrayed in an X direction.

When performing a printing process or a reading process, the sheet P is conveyed in the Y direction of the diagram at a predetermined speed along with the rotation of a conveyance roller 105, and during the conveyance, the printing process by the print head 100 and the reading process by the read head 107 are performed. The sheet P in a position where the printing process by the print head 100 or the reading process by the read head 107 is performed is supported from below by a flat plate-shaped platen 106, and thereby the distances from the print head 100 and the read head 107, and smoothness are kept.

Figure 4A:
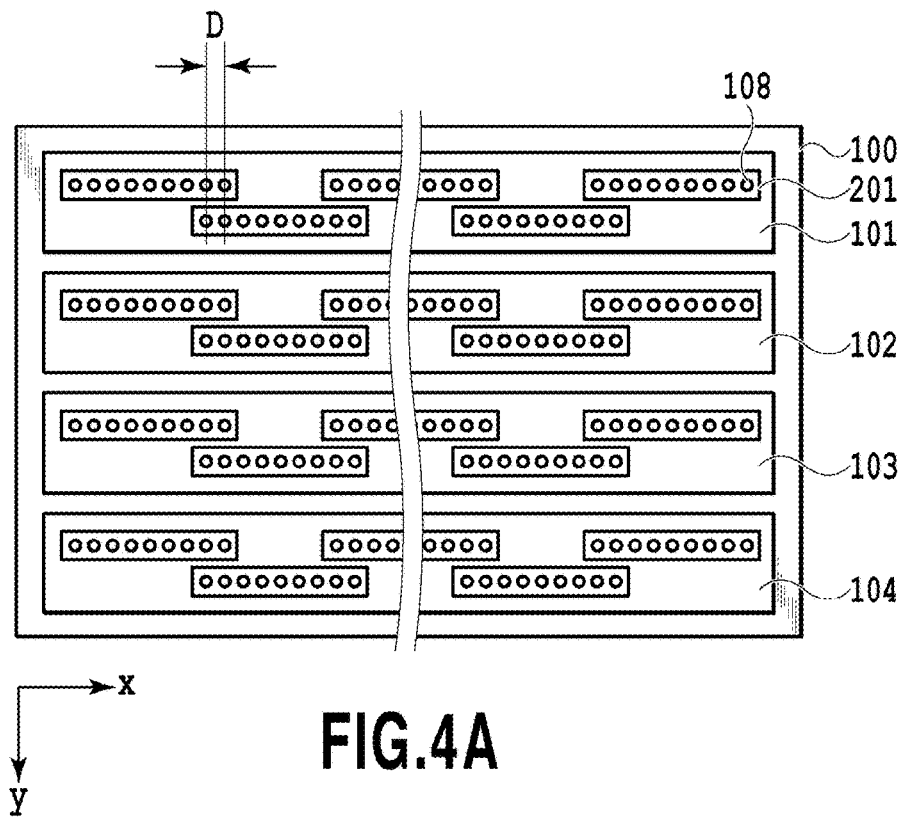
FIGS. 4A and 4B are diagrams illustrating the array configuration of printing elements and the array configuration of reading elements, respectively.
Figure 4B:
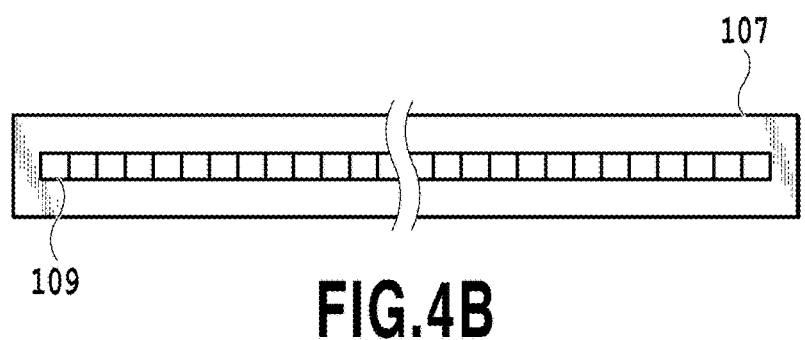

FIGS. 4A and 4B are diagrams illustrating the array configuration of the printing elements in the print head 100 and the array configuration of the reading elements in the read head 107, respectively. In the print head 100, in each of the printing element arrays 101 to 104 corresponding to the respective ink colors, multiple printing element substrates 201 each on which multiple printing elements 108 are arrayed at constant pitches are arranged continuously in the X direction and alternately in the Y direction with overlap regions D provided. Individual printing elements 108 eject corresponding inks at a constant frequency in accordance with print data onto a sheet P conveyed in the Y direction at the constant speed, and thereby an image having a resolution corresponding to the array pitch of the printing elements 108 is printed on the sheet P.

On the other hand, in the read head 107, multiple reading sensors 109 are arrayed in the X direction at predetermined pitches. In addition, although not illustrated in the diagram, each of the reading sensors 109 is configured in which multiple reading elements each of which probably serves as a minimum unit for a read pixel are arrayed in the X direction. The individual reading elements of the reading sensors 109 image at a predetermined frequency an image on a sheet P conveyed in the Y direction at the constant speed, and thereby the entire image printed on the sheet P can be read at the array pitches of the reading elements.

In the following, a unique portion detecting algorithm in the present embodiment will be specifically describe. The unique portion detecting algorithm in the present embodiment is an algorithm for imaging an already printed image, and performing a predetermined image process on the resulting image data in order to extract a unique portion like a defect. An apparatus for printing an image is not necessarily required to be the inkjet printing apparatus as the multifunction peripheral 6. However, in the following, the case where an image printed by the print head 100 of the multifunction peripheral 6 is read by the read head 107 will be described.

Figure 5:
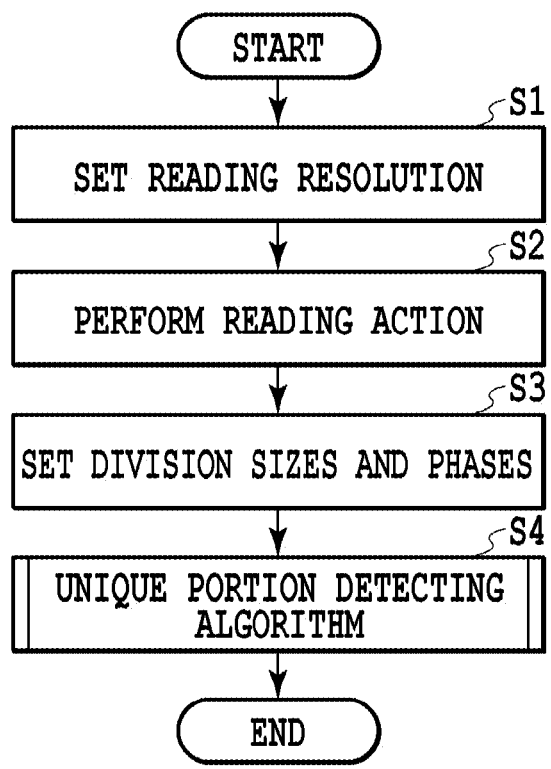
FIG. 5 is a flowchart illustrating the basic steps for unique portion detection in a first embodiment.

FIG. 5 is a flowchart for explaining the basic steps for unique portion detection performed by the image processing apparatus 1 of the present embodiment. When this process is started, the image processing apparatus 1 sets a reading resolution in Step S1. A specific setting method will be described later in detail.

In subsequent Step S2, in accordance with the reading resolution set in Step S1, the reading action is performed on an image as an inspection object. That is, by driving the scanner controller 307, output signals from the multiple reading elements arrayed in the reading sensors 109 are obtained, and on the basis of the output signals, image data having the reading resolution set in Step S1 is generated. In the present embodiment, image data is defined as including R (red), G (green), and B (blue) luminance signals.

In Step S3, the CPU 301 sets a division size and a phase to be used for the unique portion detecting algorithm in subsequent Step S4. In Step S3, at least one or more division sizes and at least one or more phases are set. The definitions of the division size and the phase will be described later in detail. In Step s4, on the basis of the division sizes and the phases set in Step S3, the unique portion detecting algorithm is performed on the image data generated in Step S2.

Figure 6:
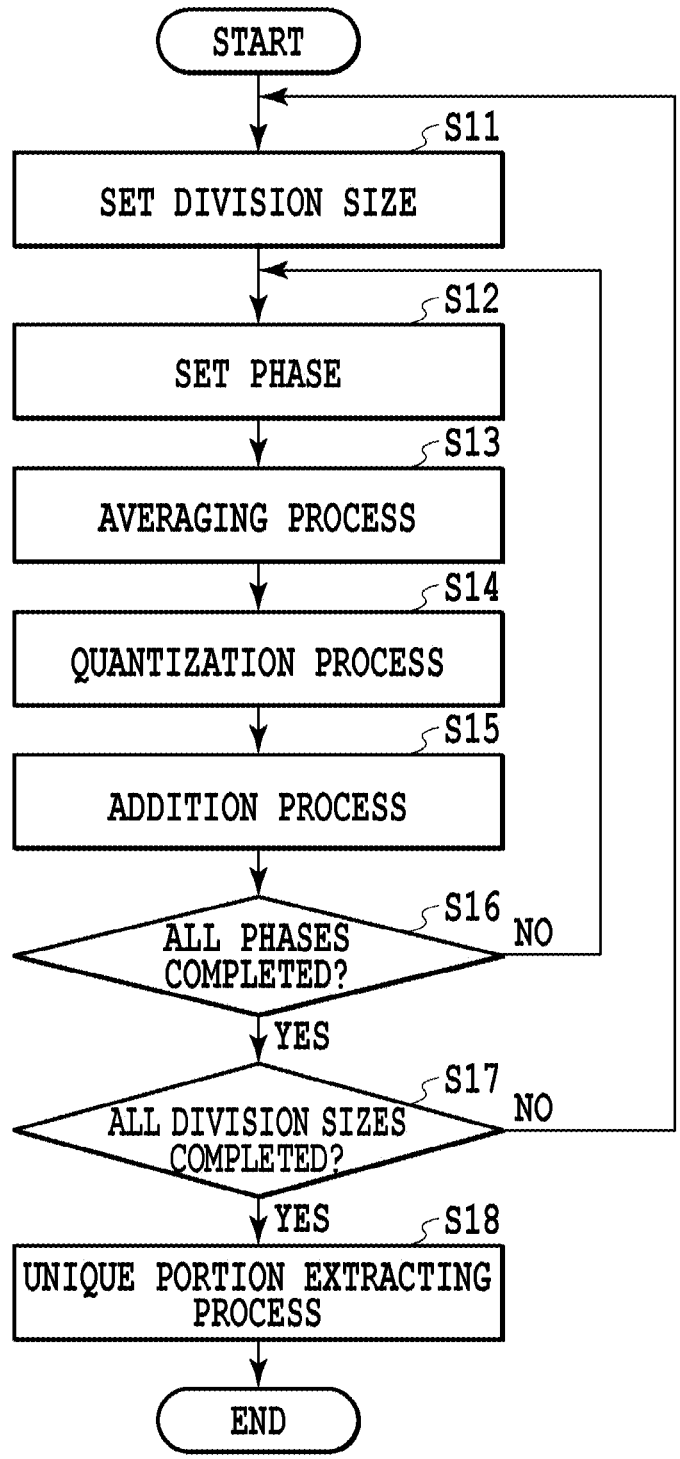
FIG. 6 is a flowchart illustrating a unique portion detecting algorithm in the first embodiment.

FIG. 6 is a flowchart for explaining the steps of the unique portion detecting algorithm performed by the CPU 301 in Step S4. When this process is started, in Step S11, the CPU 301 first sets one division size from among the multiple division sizes set in Step S2. Further, in Step S12, the CPU 301 sets one phase from among the multiple phases set in Step S3. Then, in Step S13, on the basis of the division size set in Step S11 and the phase set in Step s12, the image data acquired in Step S2 is divided to perform an averaging process.

Figure 7A:
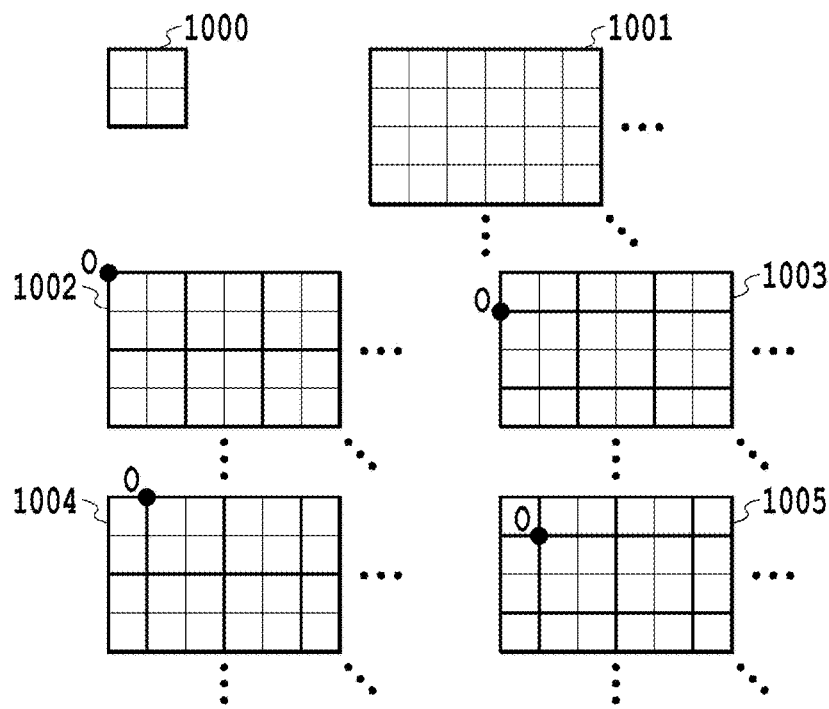
FIGS. 7A and 7B are diagrams for explaining image data division states.
Figure 7B:
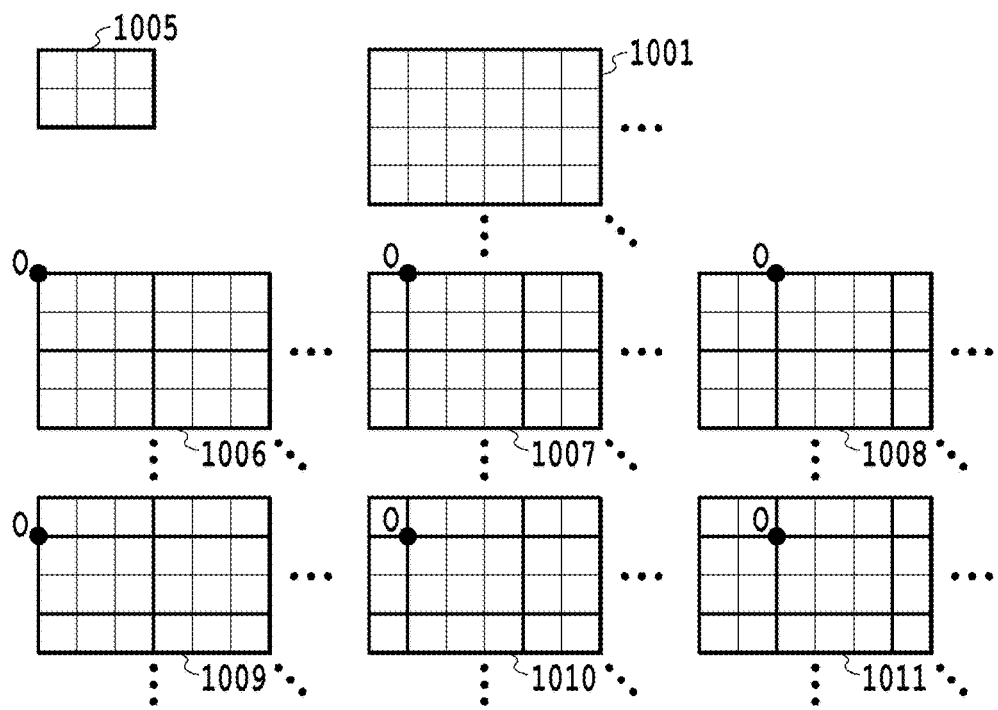

FIGS. 7A and 7B are diagrams for explaining image data division states based on a division size and a phase. FIG. 7A illustrates the case where the division size is set to 2×2 pixels, and FIG. 7B illustrates the case where the division size is set to 3×2 pixels. In the case where the division size 1000 is set to 2×2 pixels as in FIG. 7A, an image data area 1001 is divided on a 2×2 pixel basis, and can be divided in four different ways as indicated by 1002 to 1005. As described, the phase can be considered as indicating the origin O of a designated division size. In the case where the division size 1005 is set to 3×2 pixels as in FIG. 7B, the image data area 1001 can be divided in six different ways as indicated by 1006 to 1011, meaning that six different phases are present.

As the division size is increased, the number of settable phases also increases; however, it is not necessarily required to set all phases for one division size. It is only necessary to set at least one or more phases from among settable phases in Step S3 of FIG. 5, and in Step S12 of FIG. 6, set one of the phases set in Step S3.

Returning to FIG. 6, in Step S13, the averaging process is performed for each of division areas obtained by the division in Step S12. Specifically, an average value of pieces of luminance data of multiple pixels included in each of the division areas is obtained. When doing this, the average value of the pieces of luminance data of the respective pixels may be obtained by directly averaging pieces of RGB luminance data of the respective pixels, or by multiplying the pieces of RGB luminance data respectively by predetermined weighting coefficients and then adding the pieces of weighted data. Further, luminance data of anyone of RGB colors may be directly used as luminance data of a pixel.

In Step S14, the average value calculated in Step S13 is quantized on a pixel basis. The quantization may be binarization or multivalued quantization into several levels. In doing so, quantized data in a state where quantized values of respective pixels are uniform within each of the division areas is obtained.

In Step S15, the quantized values obtained in Step S14 are added to addition image data. The addition image data refers to image data indicating a result of adding pieces of quantized data obtained when variously changing the division size and the phase. When the quantized data obtained in Step S14 is based on the initial phase corresponding to the initial division size, the addition image data obtained in Step S15 is the same as the quantized data obtained in Step S14.

In subsequent Step S16, the image processing apparatus 1 determines whether or not all phases corresponding to a currently set division size have been processed. When the image processing apparatus 1 determines that a phase to be processed still remains, the flow returns to Step S12, where the next phase is set. On the other hand, when the image processing apparatus 1 determines that all the phases have been processed or only one phase is set in Step S3, the flow proceeds to Step S17.

Figure 8A:
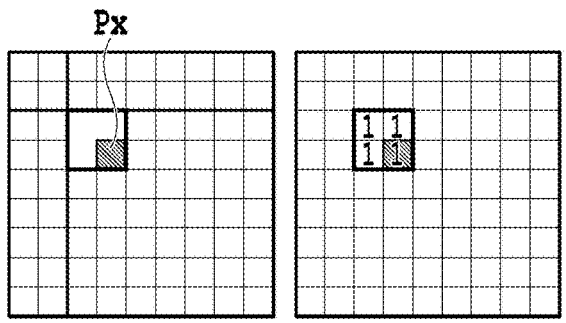
FIGS. 8A to 8E are diagrams schematically illustrating the steps of an addition process in the case of a division size of 2×2 pixels.
Figure 8B:
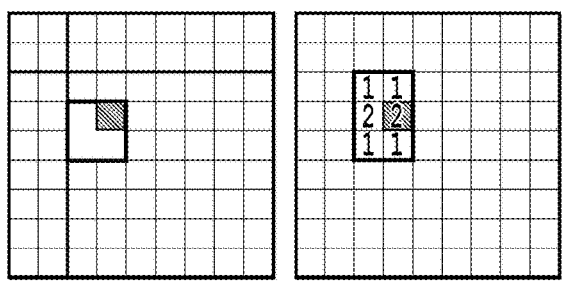
Figure 8C:
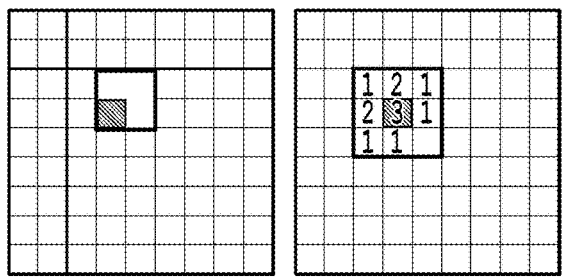
Figure 8D:
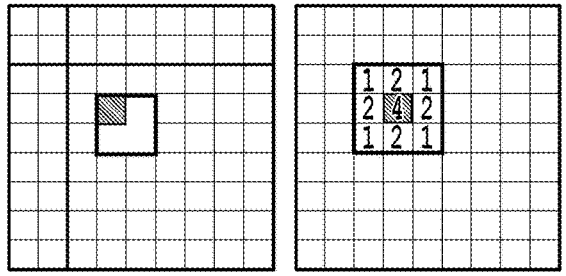
Figure 8E:
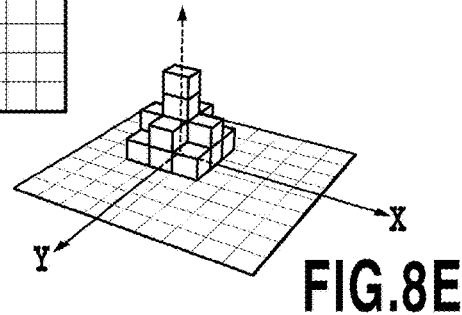
Figure 9A:
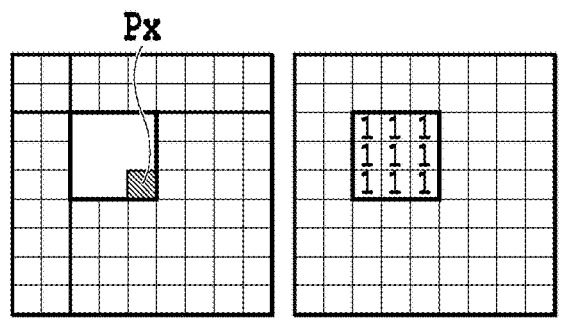
FIGS. 9A to 9J are diagrams schematically illustrating the steps of the addition process in the case of a division size of 3×3 pixels.
Figure 9B:
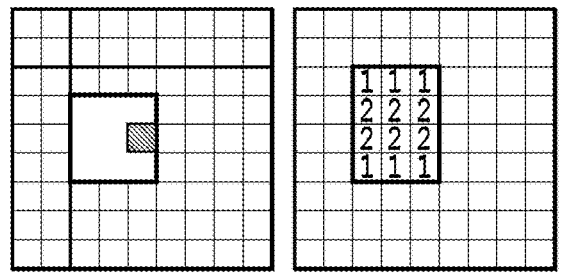
Figure 9C:
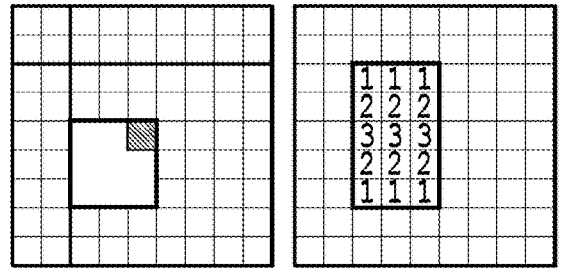
Figure 9D:
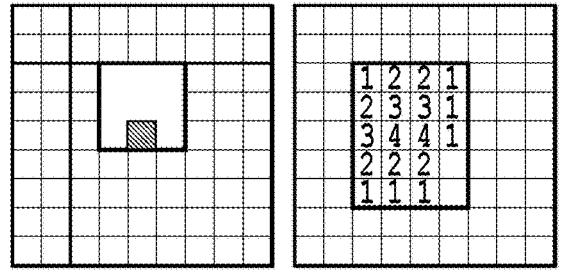
Figure 9E:
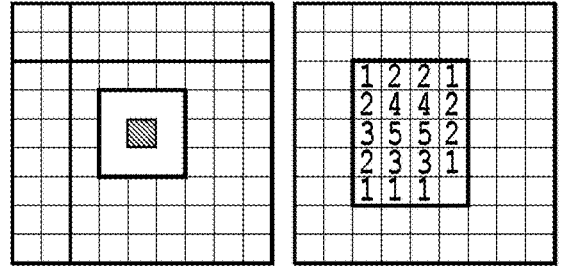
Figure 9F:
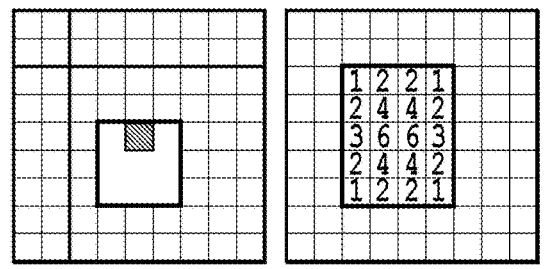
Figure 9G:
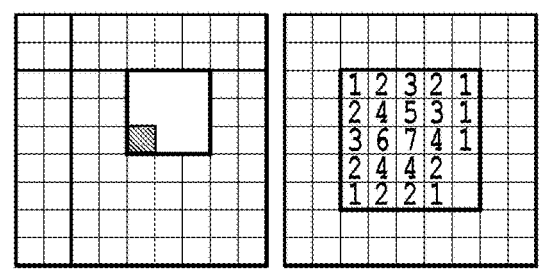
Figure 9H:
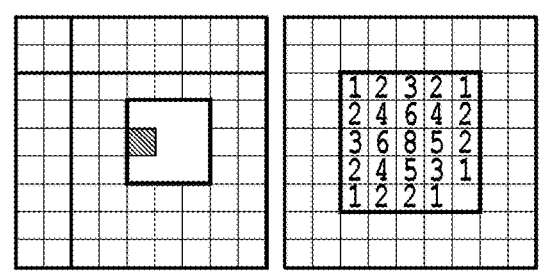
Figure 9I:
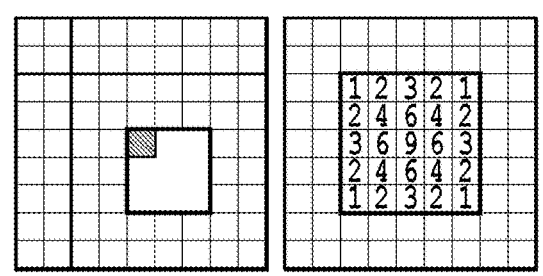
Figure 9J:
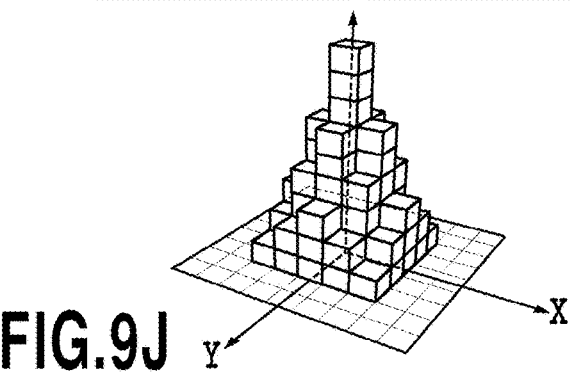

FIGS. 8A to 8E or FIGS. 9A to 9J are diagrams schematically illustrating the steps of the addition process in Step S15, which are sequentially performed for all phases corresponding to a predetermined division size. FIGS. 8A to 8D or FIGS. 9A to 9I show relationships between target pixel Px and phases. Further, FIG. 8E or FIG. 9J shows addition result respectively. When the division size is set to 2×2 pixels, four different phases are present. In FIGS. 8A to 8D, in the process of sequentially changing the four different phases, the number of times of using luminance data of a peripheral pixel in order to perform the addition process for a target pixel Px is indicated on a pixel basis. On the other hand, when the division size is set to 3×3 pixels, nine different phases are present. In FIGS. 9A to 9I, in the process of sequentially changing the nine different phases, the number of times of using luminance data of a peripheral pixel in order to perform the addition process for a target pixel Px is indicated on a pixel basis.

In any of the diagrams, the target pixel Px has the largest number of additions because the target pixel Px itself is used in all phases included in a division area, and has the largest contribution to an addition result, as showed in FIGS. 8E and 9J. A pixel more distant from the target pixel Px has a smaller number of additions, and has a smaller contribution to an addition result. That is, a final result obtained is such that a filtering process is performed with the target pixel as the center.

Returning to the flowchart in FIG. 6, in Step S17, the image processing apparatus 1 determines whether or not all the division sizes set in Step S3 have been processed. When the image processing apparatus 1 determines that a division size to be processed still remains, the flow returns to Step S11, where the next division size is set. On the other hand, when the image processing apparatus 1 determines that all the division sizes have been processed or only one division size is set in Step S3, the flow proceeds to Step S18.

In Step S18, a unique portion extracting process is performed on the basis of currently obtained addition image data. A method for the extracting process is not particularly limited. As the method, a publicly known determination processing method can be used, such as a method adapted to, as a unique portion, extract a spot where a variation in signal value is large as compared with pieces of peripheral luminance data. This process ends here.

Information on the unique portion extracted in accordance with the above-described algorithm can then be used for various applications. For example, in image defect inspection, an inspector can display the unique portion as a popup in order to make the defect portion easily determinable. In this case, the inspector can confirm the unique portion on the basis of a popup image, and repair the defect portion or eliminate the image as a defective image. Also, the information on the unique portion can also be stored for use in another system.

Further, in the case of a device having a function of correcting a defect to a normal state, the information on the unique portion can be set so as to be usable for a correction process. For example, when an area where luminance is high or low as compared with surrounding areas is extracted, an image processing parameter for correction can be prepared for that area. In addition, it is also possible to detect whether or not ejection failure is present in the inkjet printing apparatus, and if present, perform a maintenance process of the print head for a printing element at a relevant position.

In any case, as long as employing the above-described unique portion detecting algorithm, since a unique portion is extracted on the basis of the addition of pieces of quantized data obtained by variously changing the division size and the phase, a substantial defect can be made apparent while suppressing noise caused by each read pixel to an appropriate level.

Meanwhile, as a result of intensive examination, the present inventors have determined that when the features of a defect as a detecting object are clear, it is effective to adjust a reading resolution and a division size at the time of reading an inspection image depending on the features. Conversely, there has been the possibility that when the reading resolution and the division size are not set within appropriate ranges, respectively, a unique portion cannot be effectively detected or a load on and time for the extracting process are uselessly increased. For this reason, in the present embodiment, in consideration of the features of a defect as a detecting object, in Steps S1 and S3 of the flowchart in FIG. 5, the reading resolution and division sizes suitable for the features are set. In the following, the relationship between the features of a defect as a detecting object in the present invention and the reading resolution and division sizes suitable for the features will be specifically described.

(Feature Matters)

Figure 10A:
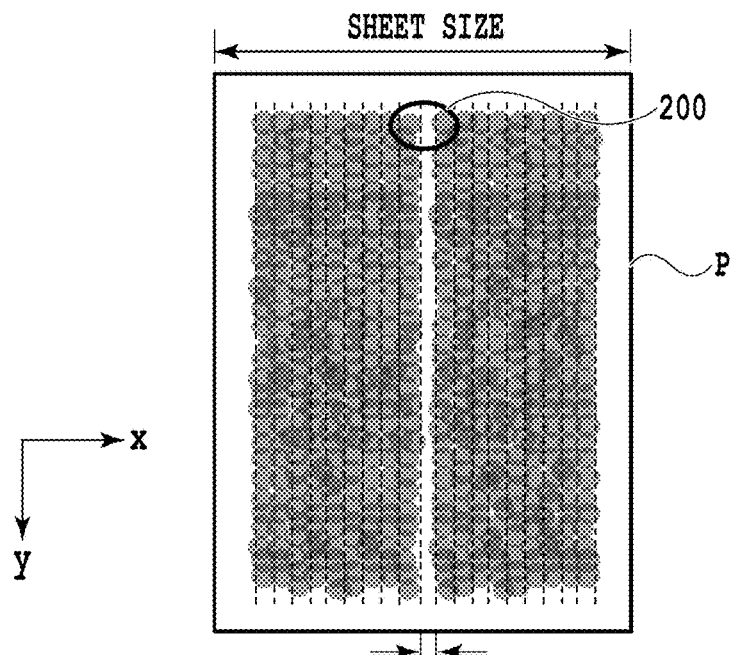
FIGS. 10A and 10B are diagrams illustrating the relationship between a unique portion of an inspection image and a reading resolution.
Figure 10B:
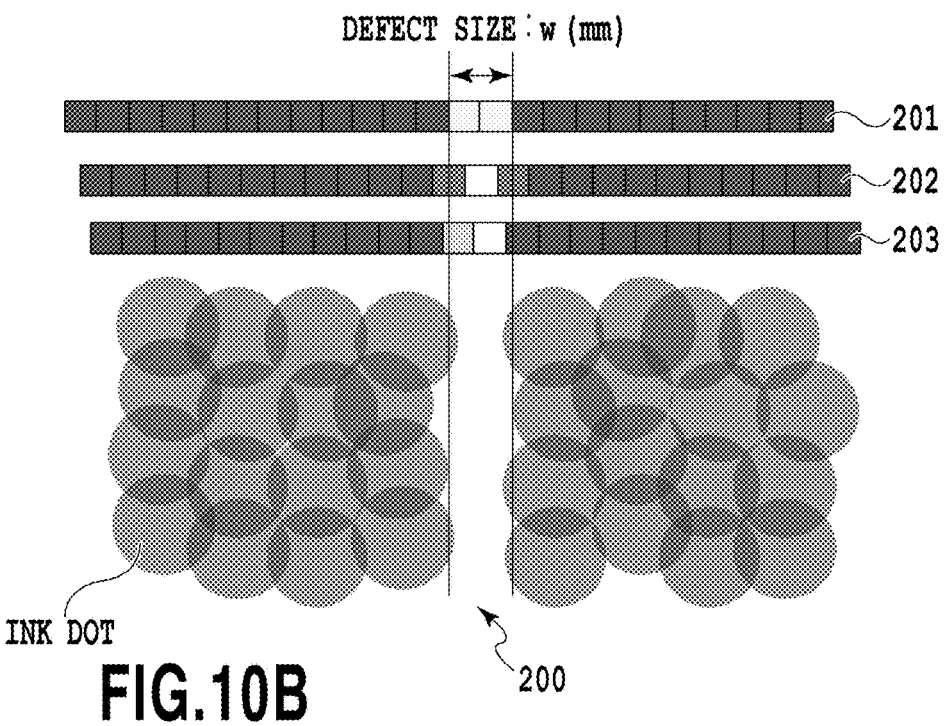

FIGS. 10A and 10B are diagrams illustrating the relationship between a unique portion of an inspection image as a detecting object in the present embodiment and a reading resolution. A white stripe occurring when the print head 100 of the inkjet printing apparatus illustrated in FIGS. 4A and 4B has an ejection failure printing element is the detecting object. FIG. 10A illustrates a state where in the uniform image printed on the entire sheet P, a white stripe 200 is caused by the ejection failure. Since the inkjet printing apparatus in the present embodiment is a full-line type printing apparatus as illustrated in FIG. 3, when an ejection failure printing element is present among the multiple printing elements, a dot at a position to be printed by that printing element is missing, and as illustrated in the diagram, the white stripe 200 extending in the Y direction occurs.

On the other hand, FIG. 10B is an enlarged diagram of the vicinity of the white stripe 200. In the diagram, three different read results 201 to 203 obtained when, in the case where the width (mm) of the white stripe 200 corresponds to appropriately two read pixels, changing the positional relationship between read pixels and the white strip are illustrated. A pixel indicated in white is a pixel where the luminance value of read data is high, and a pixel indicated in black is a pixel where the luminance value of read data is low. When the position of the white stripe 200 is substantially coincident with the position of two adjacent read pixels, as illustrated in the read result 201, the luminance values of the two adjacent pixels included in the position of the white stripe are high, and the luminance values of the other pixels are low. When the position of the white stripe is displaced from the position of two adjacent read pixels, as illustrated in the read result 202 or 203, the luminance value of one pixel completely included in the position of the white stripe is the highest, the luminance value of one pixel partially included in the position of the white strip is the second highest, and the luminance values of the other pixels are low.

In the present embodiment, the array resolution of the reading elements in the read head 107 is not particularly limited as long as it is larger than the array resolution of the printing elements in the print head 100. Also, the array resolution of the reading elements is not necessarily required to be coincident with the reading resolution during the reading process. Output signals of reading elements positioned at intervals of a predetermined number of reading elements may be set as luminance data corresponding to each read pixel, or from output signals of multiple reading elements, luminance data corresponding to one reading pixel may be generated. By making the reading resolution lower than the array resolution of the reading elements, the total number of pixels to be subjected to the unique portion detecting process can be suppressed to increase processing speed.

However, when making the reading resolution too low to thereby make the width of a read pixel larger than the width of the white stripe, a read pixel having particularly high luminance cannot be produced even in the position of the white stripe, and therefore it is difficult to extract the defect portion as a unique portion. For this reason, in the present embodiment, in order to allow a unique portion, i.e., a white stripe portion to surely include one or more read pixels, the reading resolution is set so as to make the width of the unique portion correspond to N read pixels (N≥2). That is, in the present embodiment, in order to allow a white stripe portion to surely include one or more read pixels while suppressing speed deterioration and load for processing as much as possible, the reading resolution is set in Step S1 of FIG. 5 so as to make the width of the white stripe portion correspond to two or more read pixels.

FIG. 11 is a diagram illustrating a state where one of the reading sensors 109 described with FIGS. 4A and 4B reads an object. Light emitted from an unillustrated light source is reflected at the surface of the inspection object 300, condensed by a lens 302, and then detected by each of the multiple reading elements arrayed in the reading sensor 109. Given here that the size of the reading sensor 109 in the X direction is S (mm), the field of view of the sensor L (mm), a work distance d (mm), and an image distance inside the sensor a (mm), the magnification of this system is expressed by the following expression.

$$M=a/d=S/L$$

Accordingly, given that the width of a white stripe on a sheet is w (mm), a size W resulting from imaging the white stripe on the reading sensor 109 is given by the following expression.

$$W=w \times N=w \times S/L$$

Given here that the number of reading elements arrayed in the reading sensor 109 is s, the number of reading elements K detecting an area corresponding to the width w of the white stripe is given by the following expression.

$$K=W\times s/S=w\times S/L\times s/S=w\times S/L$$

That is, in the present embodiment, when the reading resolution, in this case, the size S of the sensor is fixed such that the number of reading elements K corresponds to two or more pixels, it is necessary to consider setting the number s of reading elements. When increasing the value of K, the number s of reading elements is increased, in other words, the reading resolution is increased. On the other hand, in order to reduce a processing load, it is also possible to decrease the resolution by decreasing the number s of reading elements or set an average value of pieces of read luminance data as luminance data corresponding to one read pixel. In any case, it is only necessary to set the resolution so as to make two or more read pixels correspond to the width of the white stripe area.

Meanwhile, in the above, the resolution appropriate for read pixels is described; however, the present embodiment is also characterized by setting a division size to an appropriate value. In the following, an appropriate division size will be described.

FIGS. 12A to 12C are diagrams illustrating the results of the quantization and addition processes performed when variously changing the division size and the phase. For simplicity of description here, illustrated are results obtained when a width in the Y direction is fixed to the width of one pixel, whereas only in the X direction, the division size is set to 2 pixels, 4 pixels, 6 pixels, 8 pixels, 10 pixels, and 12 pixels, and a white stripe corresponding to substantially 8 read pixels is inspected. FIG. 12A illustrates a result of reading an image area including a white stripe area. Signal values of areas applied with ink are low (0), whereas a signal value of the white stripe area is high (255).

FIG. 12B illustrates the results of the quantization process performed when changing the phase with each of the division sizes kept. The results illustrated here correspond to results of Step S14 in the flowchart of FIG. 6. As the quantization process, binarization using a threshold value of 95 is used. In the case of the division size of 2×1 pixels, 2 different phases are present. Also, in the cases of the division sizes of 4×1 pixels, 6×1 pixels, 8×1 pixels, 10×1 pixels, and 12×1 pixels, 4, 6, 8, 10 and 12 different phases are present, respectively.

FIG. 12C illustrates the results of further adding quantized values illustrated in FIG. 12B. The results illustrated here correspond to results of Step S15 in the flowchart of FIG. 6. From the results in FIG. 12C, it can be expected that the white stripe (unique portion) is present near an area 401, and for example, the area 401 can be displayed as a popup to notify an inspector.

On the other hand, FIGS. 13A to 13C are diagrams illustrating the case where on both sides of a white stripe comparable to that in FIGS. 12A to 12C, white noises are present. It is assumed that in the diagrams, with respect to the reading resolution, the left noise has a width corresponding to approximately 4 pixels, and the right noise has a width corresponding to approximately 3 pixels. When detecting and processing such noises on the basis of various division sizes as described above, in the case of a small division such like a 2×1 pixels, many read pixels within the division size are included in a noise area, and a frequency of a quantized value of "1" (white) is high. On the other hand, in the case of a large division size like 10×1 pixels or 12×1 pixels, many read pixels within the division size are not included in a noise area, and therefore a quantized value of "1" (white) is unlikely.

When adding all of such results, a result as illustrated in FIG. 13C is obtained, and in addition to a unique portion near an area 501, the white noises 502 and 503 that do not matter so much are also extracted. As a result, when displaying such areas as a popup to notify an inspector, the inspector also confirms the areas that are not actually needed. In order to avoid such an adverse effect, in the present embodiment, a limitation is placed on a division size to be set so as to surely extract a white stripe and at the same time, prevent the extraction of smaller noise than the white stripe as much as possible. Specifically, in Step S3 of the flowchart illustrated in FIG. 5, only division sizes larger than the size of a unique portion as an extracting object are set.

Figures 14A, 14B, 14C:
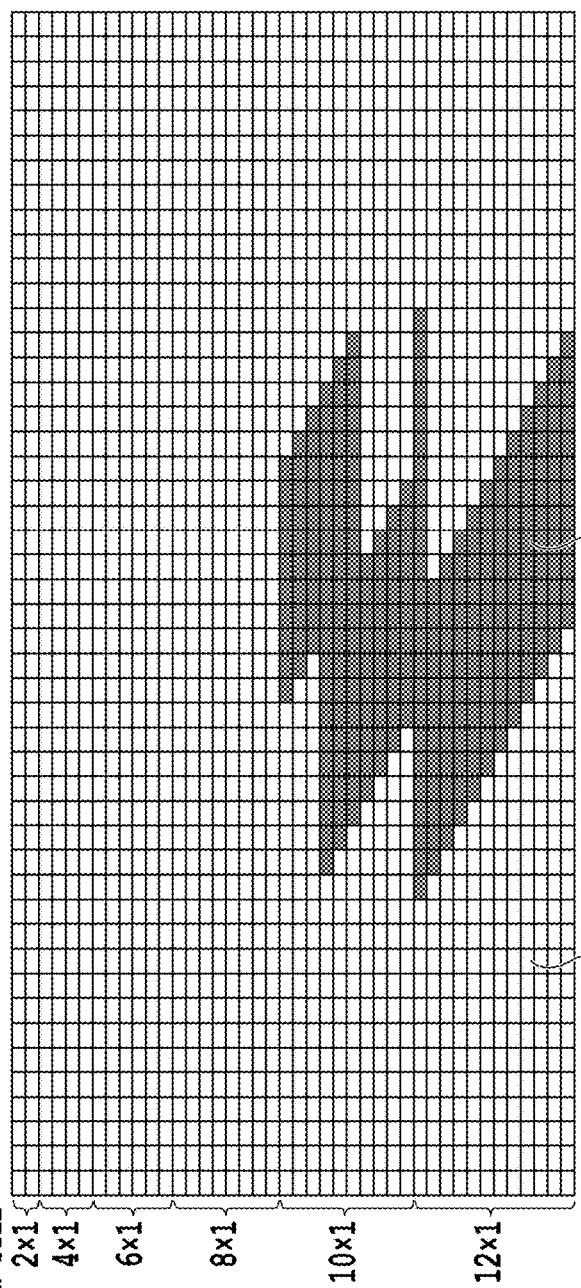
FIGS. 14A to 14C are diagrams illustrating the results of the quantization and addition processes.

FIGS. 14A to 14C illustrates the case where the division size limited to 10×1 pixel and 12×1 pixels is applied with respect to the same image as that of FIGS. 13A to 13C. Even near the noise areas, any pixel having a quantized value of "1" (white) is not present, and the white noises are not extracted.

As described above, according to the present embodiment, in Step S1 of FIG. 5, the reading resolution is set so as to make the width of a unique portion to be extracted correspond to two or more read pixels (N pixels), and in Step S3, the division sizes larger than the total size of that N read pixels are set. In doing so, a unique portion to be extracted can be efficiently extracted while avoiding the extraction of noise that does not matter so much.

Note that in FIGS. 12 to 14, for simplicity of description, the width of a division size in the Y direction is fixed to one pixel size, but of course, may have the total size of two or more pixels. In the above examples, a unique portion as an extracting object is set as a white stripe extending in the Y direction, and therefore the width of a division size in the Y direction hardly affect a detection result. However, the present invention can also effectively function even when detecting a unique portion of which the size in the Y direction is finite. In this case, it is only necessary to set the reading resolution in the Y direction so as to make the width of the unique portion in the Y direction correspond to two or more (N) read pixels, and set the division sizes larger than the total size of the N read pixels in the Y direction.

Second Embodiment

In the first embodiment, as described with the flowchart illustrated in FIG. 6, the process adapted to obtain an addition result of average values in multiple phases corresponding to each division size is performed. Meanwhile, as described using FIGS. 8A to 8E and FIGS. 9A to 9J, such a process finally results in like a filtering process with a target pixel as the center. In consideration of such a point, the present embodiment is adapted to replace the addition process performed in multiple phases corresponding to each fixed division size by an addition process performed using weighting coefficients using a Gaussian filter.

Figure 15A:
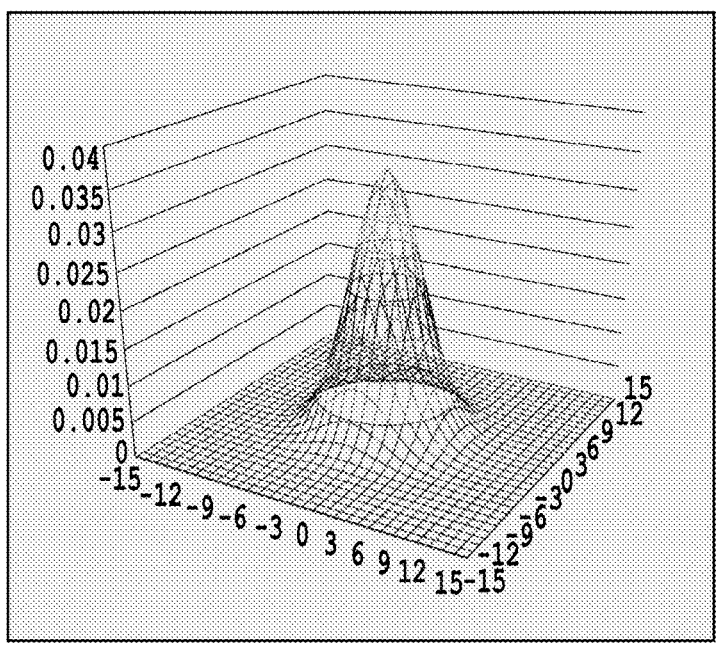
FIGS. 15A and 15B are diagrams illustrating examples of a Gaussian filter.
Figure 15B:
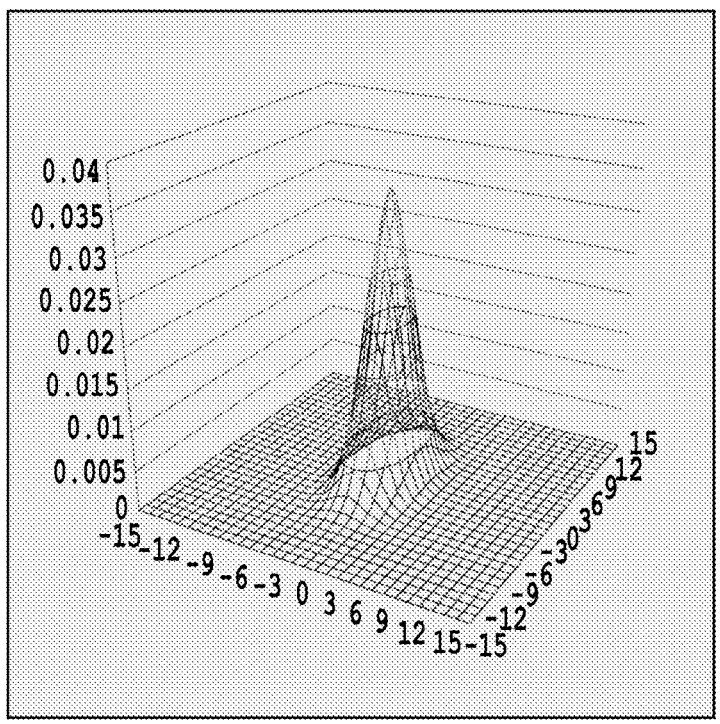

FIGS. 15A and 15B are diagrams illustrating examples of the Gaussian filter. FIG. 15A illustrates an isotropic Gaussian filter, which can be expressed by Expression 1.

$$f(x, y) = \frac{1}{2\pi\sigma^2}\exp\left(-\frac{x^2+y^2}{2\sigma^2}\right) \quad (1)$$

Here, σ represents a standard deviation.

Such an isotropic Gaussian filter corresponds to, in the first embodiment, the case of using a square division size such as 2×2 or 3×3. On the other hand, FIG. 15B illustrates an anisotropic Gaussian filter, and corresponds to, in the first embodiment, the case of using a rectangular division size such as 2×3. Such an anisotropic Gaussian filter can be generated by deviating the ratio between x and y in Expression 1. For example, FIG. 15B corresponds to a Gaussian filter generated by replacing x in Expression 1 by x'=x/2. The present embodiment can employ any of the Gaussian filters. However, in the following, the description will be continued while taking the isotropic Gaussian filter illustrated in FIG. 15A as an example.

The Gaussian filter in FIG. 15A represents coefficients of respective pixels positioned within the ranges of −15≤X≤15 and −15≤Y≤15 with a target pixel as the origin. A form adapted to set the coefficients within the ranges of −15≤X≤15 and −15≤Y≤15 as described is similar to a state in the first embodiment where the division size is set to 8×8, and the addition process as illustrated in FIGS. 8A to 8D or FIGS. 9A to 9I is performed. That is, given that the size (diameter) of the Gaussian filter is represented by F, and the division size in the first embodiment is represented by V×V, the size F can be represented as F≈2V−1. In addition, by adjusting the Gaussian filter size F as well as the standard deviation σ, Gaussian filters having various sizes can be prepared. The present embodiment is adapted to obtain results of respectively using multiple Gaussian filters having different sizes to perform a filtering process on luminance data of a target pixel and further performing quantization, and add the results. In doing so, a unique portion extracting process can be performed on the basis of the addition result equivalent to that in the first embodiment.

Figure 16:
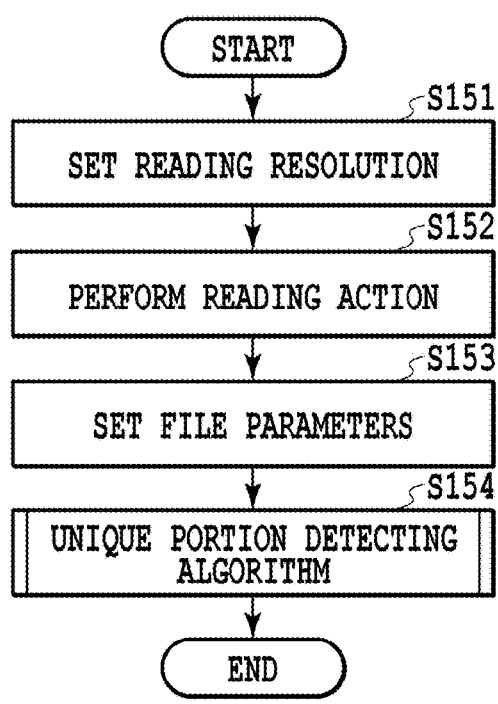
FIG. 16 is a flowchart illustrating the basic steps for unique portion detection in a second embodiment.

In the present embodiment as well, the image processing apparatus 1 can take various forms as described with FIGS. 1A to AD. FIG. 16 is a basic flowchart of a unique portion detecting algorithm performed by the image processing apparatus 1 of the present embodiment. When this process is started, the image processing apparatus 1 sets a reading resolution in Step S151, and in subsequent Step S152, performs a reading action on an inspection object. Steps S151 and S152 are equivalent to Steps S1 and S2 of FIG. 5.

In Step S153, the CPU 301 sets multiple different file parameters of a Gaussian filter used for the unique portion detecting algorithm to be performed in subsequent Step S154. The file parameters refer to parameters for designating the directionality of a Gaussian function as described with FIG. 15A or 15B, and a different filter size F. Then, in Step S154, on the basis of the file parameters set in Step S153, the predetermined unique portion detecting algorithm is performed on image data generated in Step S152.

Figure 17:
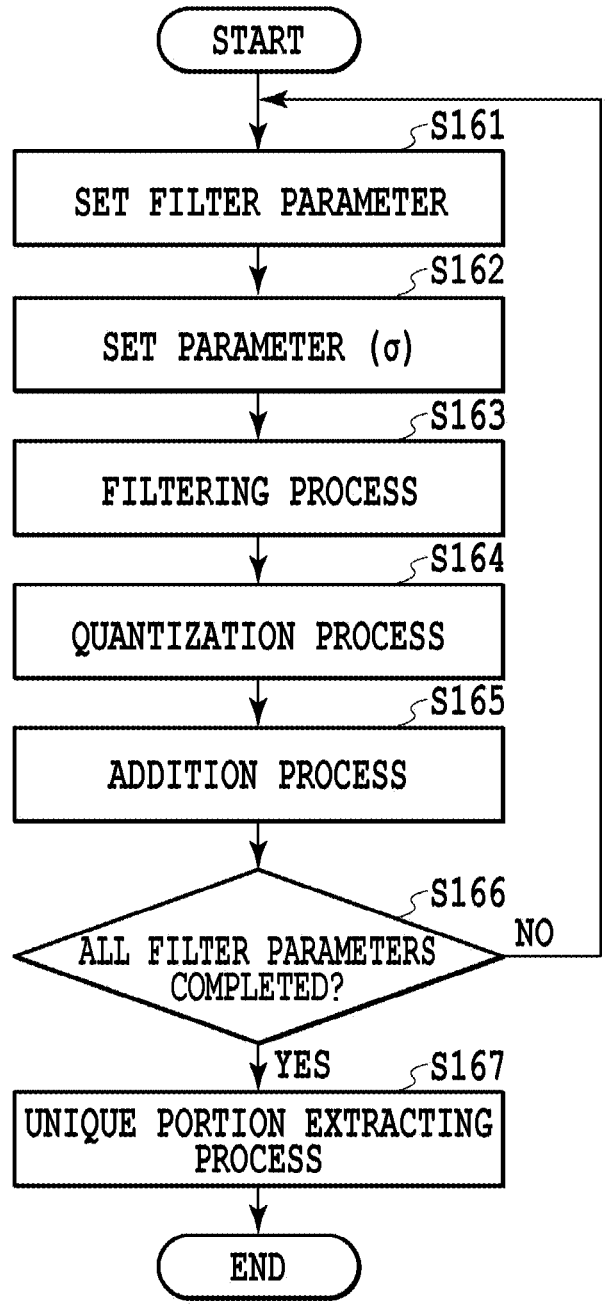
FIG. 17 is a flowchart illustrating a unique portion detecting algorithm in the second embodiment.

FIG. 17 is a flowchart for explaining the steps of the unique portion detecting algorithm performed by the CPU 301 in Step S154. The process illustrated in FIG. 17 is performed one-by-one on pixels of an image acquired in Step S152.

When this process is started, in Step S161, the CPU 301 first sets one file parameter from among the multiple file parameters set in Step S153. Further, in Step S162, the CPU 301 sets a parameter σ corresponding to the file parameter set in Step S161. The parameter σ corresponds to the standard deviation of a Gaussian function, and is assumed to be preliminarily stored in a memory related to the file parameter and/or a filter size. Setting the file parameter and the parameter σ in Steps S161 and S162 determines the shape of a Gaussian filter.

In subsequent Step S163, the Gaussian filter set in Steps S161 and S162 is used to perform a filtering process on the image data acquired in Step S152. Specifically, pieces of luminance data of the target pixel and peripheral pixels falling within the filter size F are multiplied by coefficients determined by the Gaussian filter, and the sum of the pieces of luminance data multiplied by the coefficients is calculated as a filtering process value for the target pixel.

In Step S164, a quantization process is performed on the filtering process value obtained in Step S163, and further, in Step S165, a quantized value obtained in Step S164 is added to addition image data. The addition image data refers to image data for obtaining a result of adding pieces of quantized data obtained by variously changing the file parameter, i.e., variously changing the type of a Gaussian filter. When the quantized data obtained in Step S164 is a result obtained using the initial Gaussian filter, the addition image data is the same as the quantized data obtained in Step S164.

In subsequent Step S166, the image processing apparatus 1 determines whether or not all the file parameters set in Step S153 have been processed. When the image processing apparatus 1 determines that a file parameter to be processed still remains, the flow returns to Step S161, where the next file parameter is set. On the other hand, when the image processing apparatus 1 determines that all the file parameters have been processed, the flow proceeds to Step S167.

In Step S167, on the basis of currently obtained addition image data, the unique portion extracting process is performed. An extracting method is not particularly limited as in the first embodiment. This process ends here.

As with the first embodiment, the present embodiment is also adapted to surely extract a white stripe and at the same time prevent the extraction of smaller noise than the white stripe. For this purpose, in Step S153, a limitation is placed on the file parameters to be set. When attempting to obtain the same effect as that of the first embodiment, it can be said that the filter size F (≈2V−1) is preferably two times or more the size of a unique portion as an extracting target. On the other hand, when increasing the filter size too much, even when a target pixel is present within a white stripe, luminance after the filtering process does not exhibit a sufficiently high value, and therefore the defect portion cannot be extracted as a unique portion. For this reason, in the present embodiment, the upper limit Fmax and the lower limit Fmin are provided for the filter size F, and in Step S153, it is adapted to set only filter sizes between Fmax and Fmin.

As described above, the present embodiment is adapted to, in Step S151 of FIG. 16, set the reading resolution so as to make the width of a unique portion to be extracted correspond to two or more (N) read pixels. Then, in Step 153, the file parameters are set so as to make filter sizes equal to or more than the total size of (2N−1) pixels as compared with the N read pixels. In doing so, the unique portion to be extracted can be efficiently extracted while avoiding the extraction of noise that does not matter so much.

Other Embodiments

In the above-described embodiments, as an example of the form in which an image printed by the multifunction peripheral 6 is read by the same multifunction peripheral, the full-line type inkjet printing apparatus illustrated in FIG. 3 is used. However, as the multifunction peripheral 6, a serial type inkjet printing apparatus as illustrated in FIG. 18 can also be employed.

Figure 18:
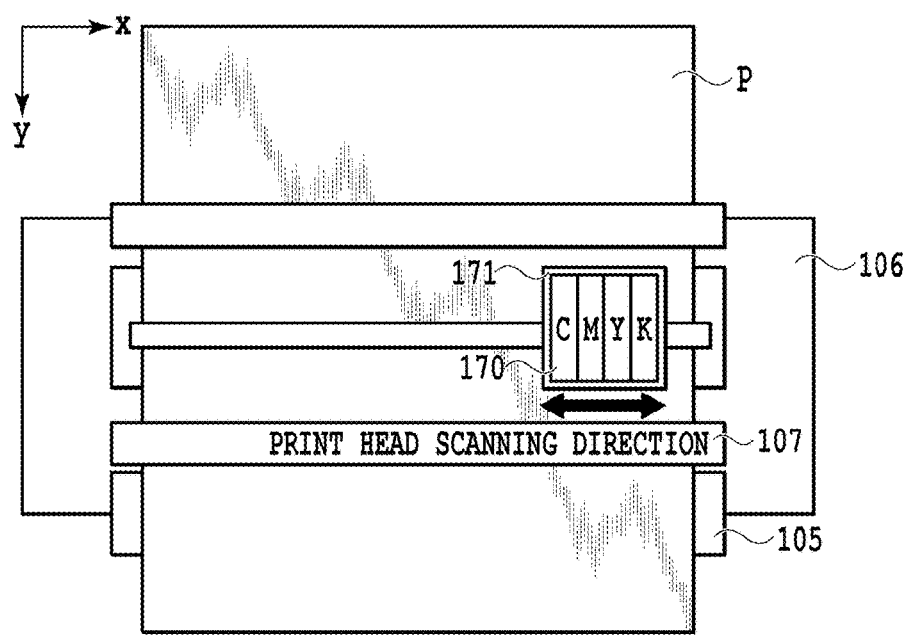
FIG. 18 is a schematic configuration diagram of a serial type inkjet printing apparatus.

In FIG. 18, a print head 170 makes reciprocating movement in an X direction in the diagram in a state of being mounted on a carriage 171, and during the movement, from four printing element arrays, black (K), cyan (c), magenta (M), and yellow (Y) inks are respectively ejected. After the end of one print scan, a sheet P is conveyed in a Y direction by a distance corresponding to the print width of the print head 170. By alternately repeating such a print scan and conveyance action, an image is formed on the sheet. On the other hand, a read head 107 is configured to include multiple reading elements arrayed in the X direction as in FIG. 3.

When an ejection failure printing element occurs in the serial type inkjet printing apparatus as in FIG. 18, white stripes extend in the X direction. When attempting to read such white stripes by the read head 107, the width direction of the white stripes (Y direction) intersects with the array direction of the reading elements (X direction). For this reason, in Step S1 of FIG. 5, a reading resolution in the Y direction is set. In this case, the reading resolution can be adjusted by changing a read period of the individual reading elements.

As another form, it can also be configured to provide a short read head, which includes reading elements arrayed in the Y direction, beside the carriage 171 in parallel to the print head 170. A reading action in this case is performed by repeating multiple scans with respect to a sheet as with a printing action, and a direction of the width of ejection failure is the same as the array direction of the reading elements. That is, a reading resolution can be adjusted by the method in the above-described embodiments.

As described, in the present invention, even when detecting a unique portion having a predetermined width in the same direction as an array direction of reading elements, or even when detecting a unique portion having a predetermined width in a direction intersecting with the array direction of the reading elements, the resolution of read pixels can be adjusted to an appropriate level.

Further, as in FIG. 1A or 1B, in the case where an image printed by a printing apparatus is read by a reading apparatus different from the printing apparatus, a reading resolution can be adjusted in further various manners. For example, in a configuration adapted to place a sheet on a flat plate-shaped reading table and collectively image an entire image by an area sensor, by changing the magnification M of an optical system, the reading resolution can be adjusted. In this case, the concept of a reading element array direction or a reading direction is substantially eliminated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-132958, filed Jul. 1, 2015, which is hereby incorporated by reference wherein in its entirety.

What is claimed is:

1. An image processing apparatus adapted to inspect a printed image, the image processing apparatus comprising:
   an acquisition unit configured to acquire image data having a predetermined reading resolution by reading the image at the predetermined reading resolution;
   a processing unit configured to perform a predetermined process on the image data;
   an extracting unit configured to extract a unique portion from image data resulting from performing the predetermined process; and
   a setting unit configured to set the predetermined reading resolution and a predetermined division size, wherein
   the predetermined process includes
   an averaging process on the image data for each of division areas obtained by dividing the image data by the predetermined division size,
   a quantization process for quantizing values obtained by the averaging process, and
   an addition process for adding values obtained by the quantization process, that are different in the dividing way of the image data in the averaging process, and
   the setting unit sets the predetermined reading resolution so as to make a width of the unique portion in the image correspond to N read pixels (N≥2), and sets the division size so as to have a width larger than N pixels.

2. The image processing apparatus according to claim 1, wherein
   the addition process adds the values obtained by the quantization process, that are different in phase for dividing the image data by the predetermined division size in the averaging process.

3. The image processing apparatus according to claim 2, wherein:
   the setting unit sets multiple different division sizes; and
   the addition process further adds the values obtained by the quantization process, that are different in the division size for dividing the image data.

4. The image processing apparatus according to claim 3, wherein:
   the setting unit sets multiple different division sizes; and
   the addition process adds the values obtained by the quantization process, that are different in the division size for dividing the image data.

5. An image processing apparatus adapted to inspect a printed image, the image processing apparatus comprising:

an acquisition unit configured to acquire image data having a predetermined reading resolution by reading the image at the predetermined reading resolution;

a processing unit configured to perform a predetermined process including a filtering process using a predetermined filter size on the image data;

an extracting unit configured to extract a unique portion from image data resulting from performing the predetermined process; and a setting unit configured to set the predetermined reading resolution and the predetermined filter size, wherein the setting unit sets the predetermined reading resolution so as to make a width of the unique portion in the image correspond to N read pixels (N≥2), and sets the filter size to (2N−1) or more pixels.

6. The image processing apparatus according to claim 5, wherein the predetermined process further includes a process of performing quantization of a value obtained by performing the filtering process using the predetermined filter size on the imaged data.

7. The image processing apparatus according to claim 6, wherein:

the setting unit sets multiple different filter sizes; and the predetermined process further includes a process of adding results of the quantization performed, that are different in the filter size used in the filtering process.

8. The image processing apparatus according to claim 1, wherein:

the image is an image printed by an inkjet printing apparatus; and the unique portion is an image missing portion caused by an ejection failure printing element of a print head.

9. The image processing apparatus according to claim 1, wherein the reading resolution is adjusted by changing magnification of an optical system when reading the image.

10. The image processing apparatus according to claim 1, wherein the reading resolution is adjusted by changing a read period of multiple individual reading elements in a read head configured with the reading elements arrayed.

11. The image processing apparatus according to claim 1, wherein the reading resolution is adjusted by changing the number of reading elements, in a read head configured with multiple reading elements arrayed, that correspond to image data of one read pixel.

12. The image processing apparatus according to claim 1, wherein the extracting unit performs a popup process for making a position of the unique portion apparent.

13. The image processing apparatus according to claim 1, further comprising:

a unit configured to store a place of the unique portion extracted by the extracting unit and generate an image processing parameter for correcting the unique portion.

14. The image processing apparatus according to claim 1, further comprising:

a printing unit configured to print the image; and a unit configured to perform a maintenance process on the printing unit depending on whether or not a unique portion to be extracted by the extracting unit is present.

15. The image processing apparatus according to claim 1, further comprising:

a determination unit configured to determine presence of a unique portion on a basis of information extracted by the extracting unit.

16. An image processing method adapted to inspect a printed image, the image processing method comprising:

an acquisition step of acquiring image data having a predetermined reading resolution by reading the image at the predetermined reading resolution;

a processing step of performing a predetermined process;

an extracting step of extracting a unique portion from image data resulting from performing the predetermined process; and a setting step of setting the predetermined reading resolution and a predetermined division size, wherein the predetermined process includes an averaging process on the image data for each of division areas obtained by dividing the image data by the predetermined division size, a quantization process for quantizing values obtained by the averaging process, and an addition process for adding values obtained by the quantization process, that are different in the dividing way of the image data in the averaging process, and the setting step sets the predetermined reading resolution so as to make a width of the unique portion in the image correspond to N read pixels (N≥2), and sets the division size so as to have a width larger than N pixels.

17. An image processing method adapted to inspect a printed image, the image processing method comprising:

an acquisition step of acquiring image data having a predetermined reading resolution by reading the image at the predetermined reading resolution;

a processing step of performing a predetermined process including a filtering process using a predetermined filter size on the image data;

an extracting step of extracting a unique portion from image data resulting from performing the predetermined process; and a setting step of setting the predetermined reading resolution and the predetermined filter size, wherein the setting step sets the predetermined reading resolution so as to make a width of the unique portion in the image correspond to N read pixels (N≥2), and sets the filter size to (2N−1) or more pixels.

18. A storage medium that stores a program for instructing a computer to perform an image processing method adapted to inspect a printed image, the image processing method comprising:

an acquisition step of acquiring image data having a predetermined reading resolution by reading the image at the predetermined reading resolution;

a processing step of performing a predetermined process;

an extracting step of extracting a unique portion from image data resulting from performing the predetermined process; and a setting step of setting the predetermined reading resolution and a predetermined division size, wherein the predetermined process includes an averaging process on the image data for each of division areas obtained by dividing the image data by the predetermined division size, a quantization process for quantizing values obtained by the averaging process, and an addition process for adding values obtained by the quantization process, that are different in the dividing way of the image data in the averaging process, and the setting step sets the predetermined reading resolution so as to make a width of the unique portion in the image correspond to N read pixels (N≥2), and sets the division size so as to have a width larger than N pixels.

19. A storage medium that stores a program for instructing a computer to perform an image processing method adapted to inspect a printed image, the image processing method comprising:

an acquisition step of acquiring image data having a predetermined reading resolution by reading the image at the predetermined reading resolution;

a processing step of performing a predetermined process including a filtering process using a predetermined filter size on the image data;

an extracting step of extracting a unique portion from image data resulting from performing the predetermined process; and a setting step of setting the predetermined reading resolution and the predetermined filter size, wherein the setting step sets the predetermined reading resolution so as to make a width of the unique portion in the image correspond to N read pixels (N≥2), and sets the filter size to (2N−1) or more pixels.

* * * * *